United States Patent [19]

Berretti

[11] E Patent Number: Re. 33,432

[45] Reissued Date of Patent: Nov. 13, 1990

[54] WET-SHAVING UNIT WITH HANDLE FORMING SEATS FOR SHAVING HEADS

[76] Inventor: Giorgio Berretti, Via di Pitigliolo 122, Strada in Chianti, Greve Firenze, Italy, 50022

[21] Appl. No.: 248,439

[22] Filed: Sep. 23, 1988

Related U.S. Patent Documents

Reissue of:

[64] Patent No.: 4,612,704
Issued: Sep. 23, 1986
Appl. No.: 687,267
Filed: Dec. 28, 1984

[30] Foreign Application Priority Data

Jan. 24, 1984 [IT] Italy ..... 9317 A/84

[51] Int. Cl.[5] ..... B26B 21/00

[52] U.S. Cl. ..... 30/47; 30/67; 30/86; 30/90; 206/354

[58] Field of Search ..... 30/47, 51, 64, 66, 67, 30/85, 86, 90, 123; 132/148, 147; 206/354

[56] References Cited

U.S. PATENT DOCUMENTS

| | | | |
|---|---|---|---|
| 1,548,164 | 8/1925 | Parker | 30/34 R |
| 3,783,493 | 1/1974 | Dawidowicz et al. | 30/47 X |
| 4,182,031 | 1/1980 | Cecil, Jr. | 30/86 X |
| 4,272,886 | 6/1981 | Asano | 30/47 |
| 4,309,821 | 1/1982 | Terry et al. | 30/85 X |
| 4,461,078 | 7/1984 | Carreker | 30/85 X |

FOREIGN PATENT DOCUMENTS

| | | | |
|---|---|---|---|
| 2203235 | 8/1973 | Fed. Rep. of Germany . | |
| 2100646 | 1/1983 | United Kingdom | 30/34 R |
| 2101091 | 1/1983 | United Kingdom | 206/354 |

*Primary Examiner*—Douglas D. Watts
*Assistant Examiner*—Willmon Fridie, Jr.
*Attorney, Agent, or Firm*—Cohen, Pontani & Lieberman

[57] ABSTRACT

A wet-shaving unit with a handle able to engage an interchangeable head being provided with at least a cutting edge, in which the handle is formed as a container for separately extractable heads. The unit may comprise two handles able to be matched in such a way as to complete and to close the head seats in a perserving arrangement, each handle forming a cover for the head seats of the other.

7 Claims, 12 Drawing Sheets

91

91
12
1B 91
91
91

214
1A 214
216
216
91
1B
1B
1A

Fig. 34
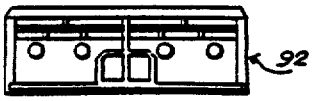
Fig. 35
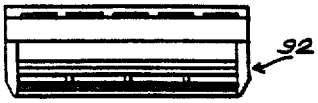
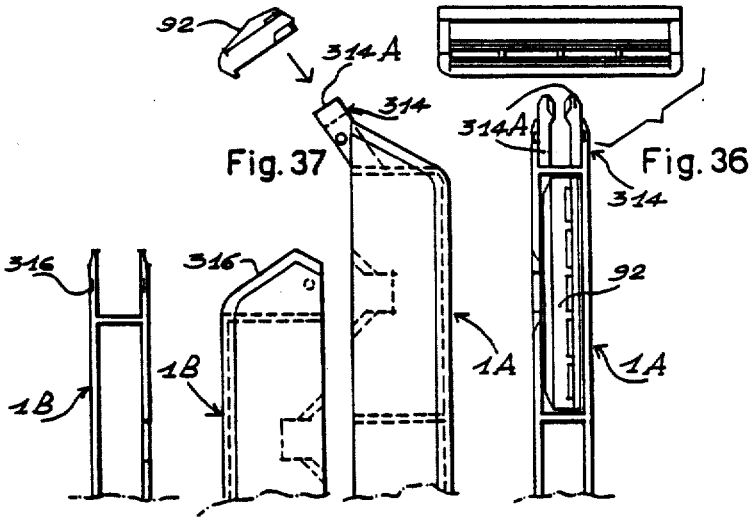
Fig. 39 Fig. 38

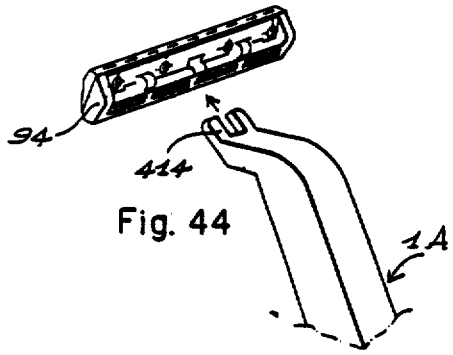
Fig. 44
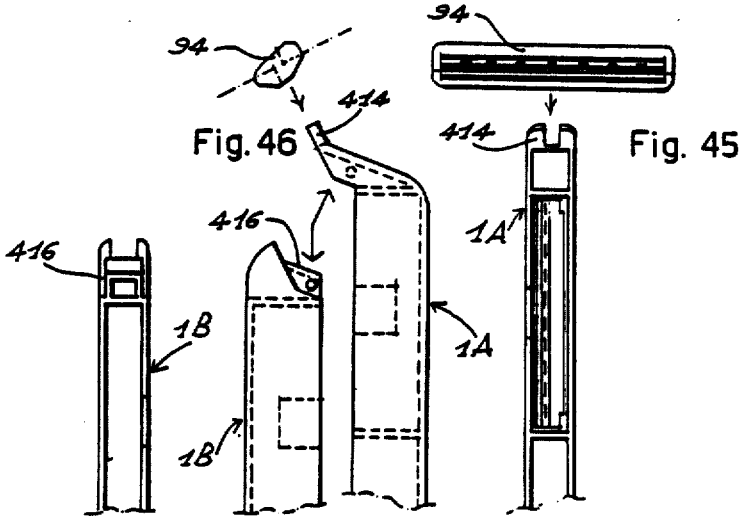
Fig. 46 Fig. 45
Fig. 48 Fig. 47

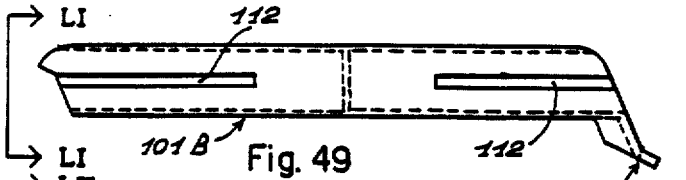
Fig. 49
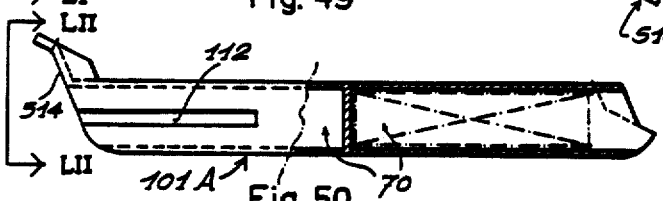
Fig. 50
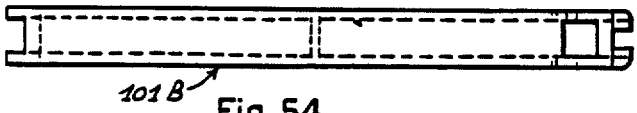
Fig. 54
Fig. 51
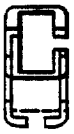
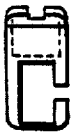
Fig. 52
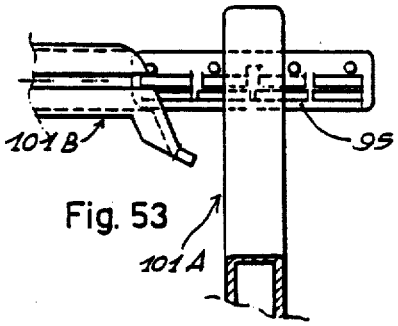
Fig. 53
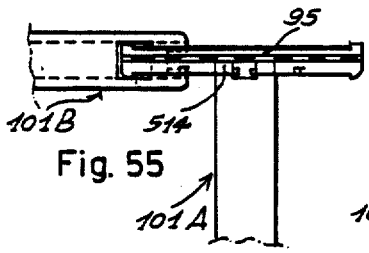
Fig. 55
Fig. 56
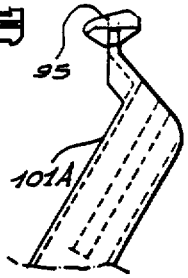

WET-SHAVING UNIT WITH HANDLE FORMING SEATS FOR SHAVING HEADS

Matter enclosed in heavy brackets [ ] appears in the original patent but forms no part of this reissue specification; matter printed in italics indicates the additions made by reissue.

The invention has the object to provide a wet-shaving unit with a handle able to engage an interchangeable head being provided with at least a cutting edge.

According to the invention, the handle is formed as a container for separately extractable or removable heads.

Practically, the shaving unit may advantageously comprise two handles able to be matched in such a way as to complete and to chose the head sets in a preserving arrangement, each handle forming a cover for the head seats of the other.

The handle may have a plurality of head sets, each of which presenting a notch able to allow the head removal by means of an analogous handle which is matched on the assembly.

The two handles may be coupled to each other by a sliding and release or tight engagement, in an opposite and overturned arrangement, in order to form a single and compact block.

Advantageously, each of the handles is realized relatively flat and of somewhat uniform thickness, and it forms open seats on a narrow side of the handle, in correspondence of which side the coupling or connection with the other handle is provided.

The removal notches may be transversally developed on the walls of the handle larger sides, in the central position of each seat.

According to one different embodiment, the seats are open at the handle end, and the notches are longitudinal in order to make the handle end, which has engaged the head, slide therein.

According to another different embodiment, several head seats are open for the removal according to two or more directions perpendicular between them.

According to a further different embodiment, the handle is provided with a cover engaging the heads which are housed in the seats formed by the handle when the cover is applied.

The invention will be better understood by a reading of the following description together with the accompanying drawing which shows a practical non limitative exemplification of the same invention. In the drawing.

Figures 19, 20, 21:
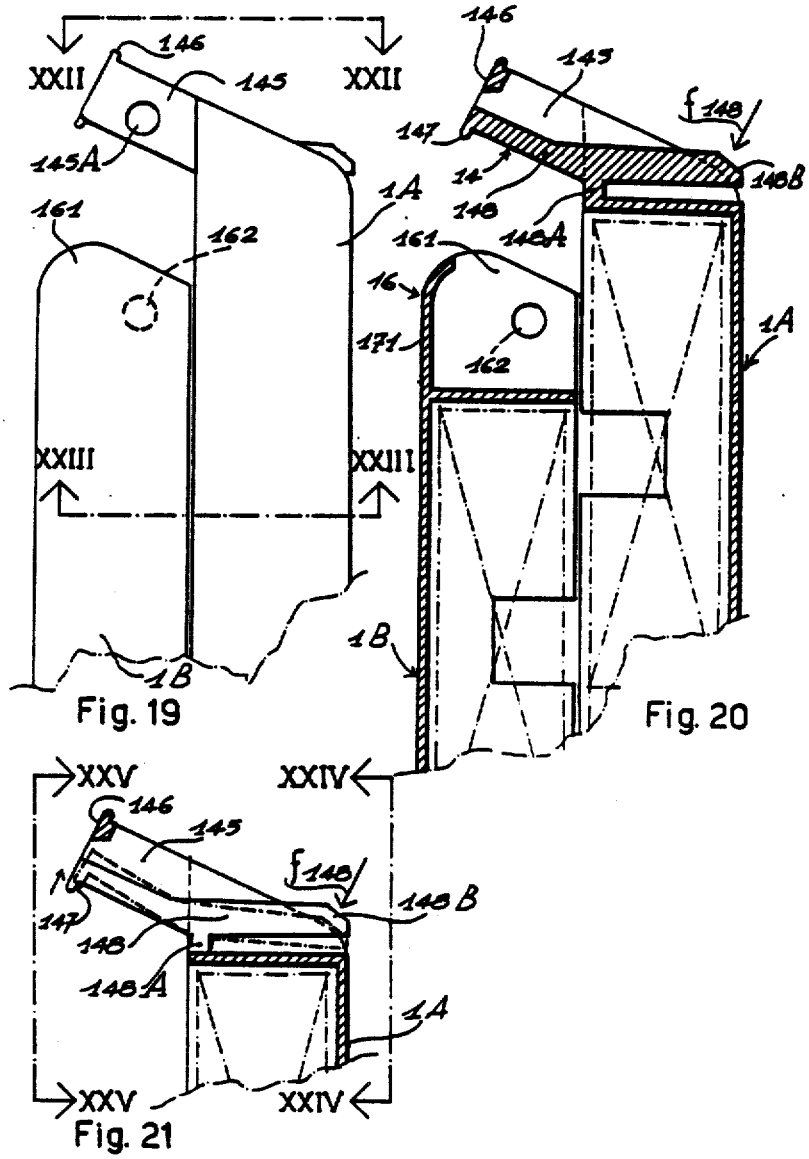
Figure 22:
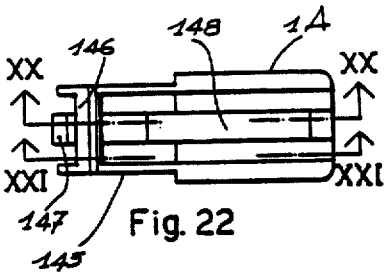
Figure 23:
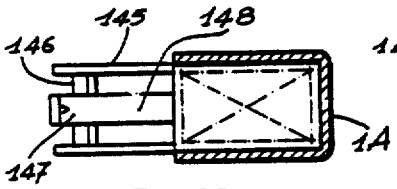
Figures 24, 25:
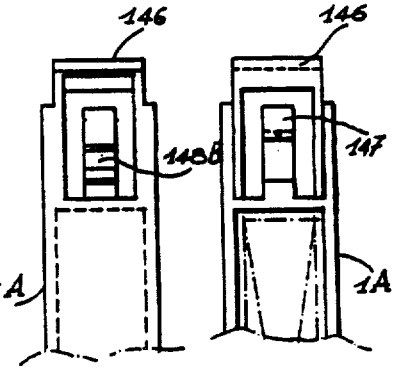
Figure 26:
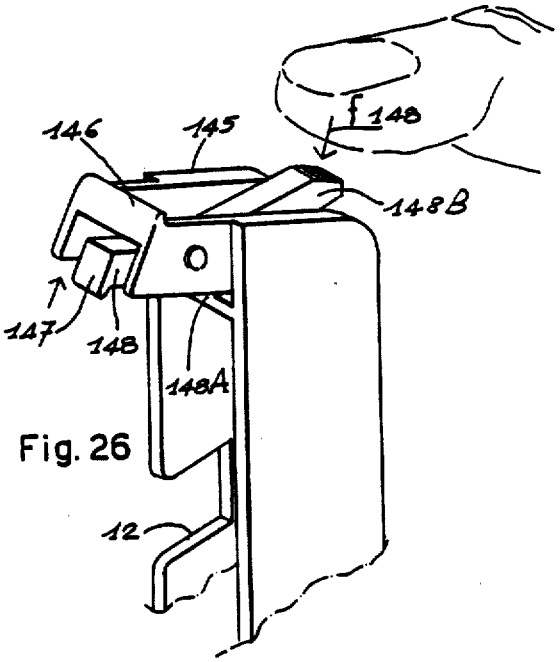
Figures 27, 28, 29, 30, 31, 32, 33:
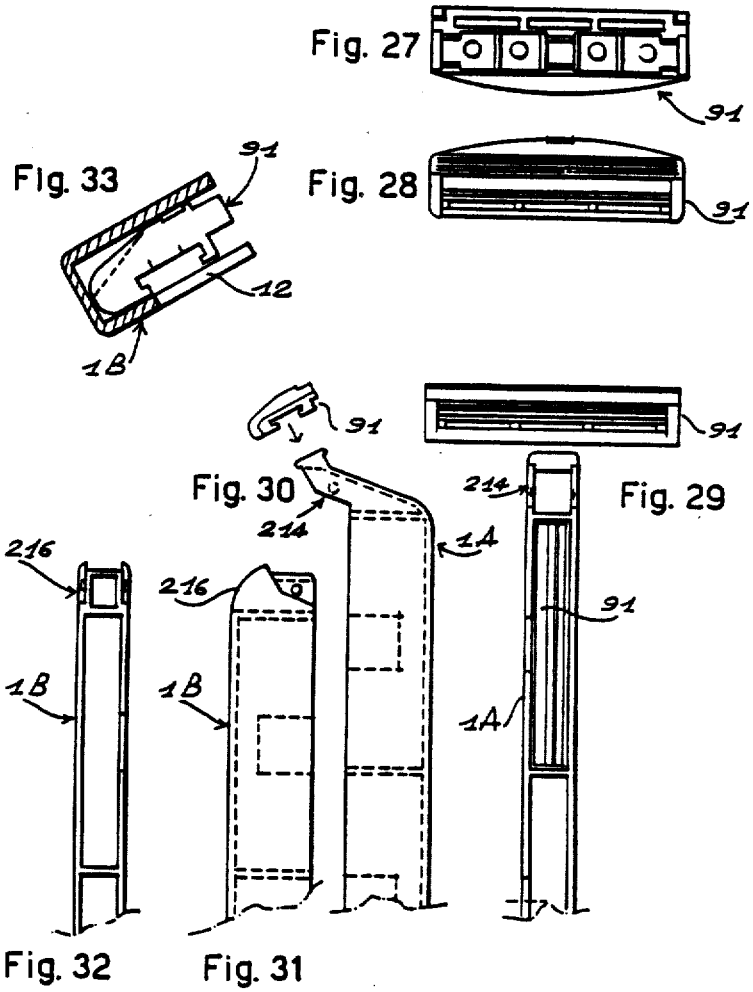
Figure 40:
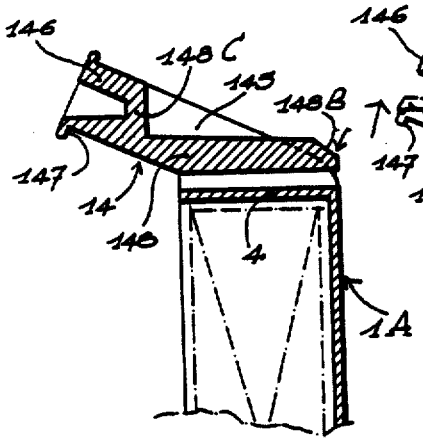
Figure 41:
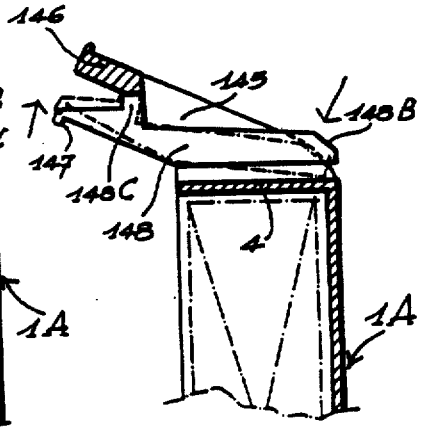
Figure 42:
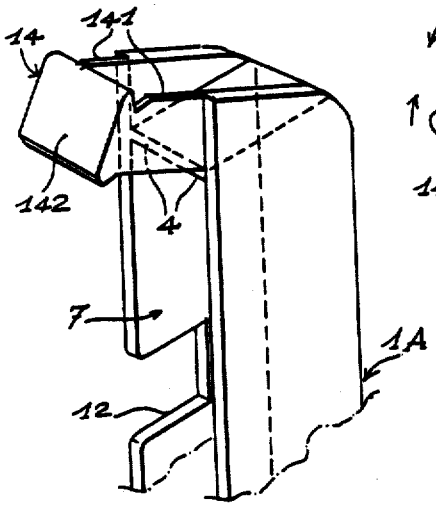
Figure 43:
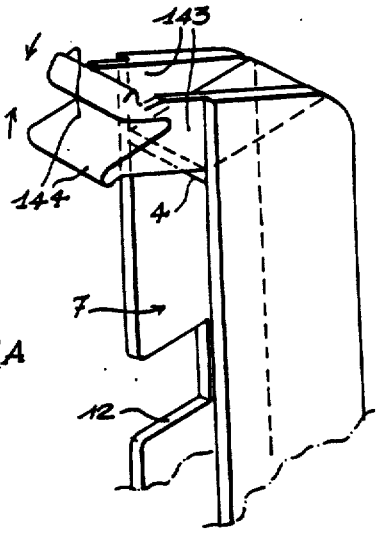
Figure 57:
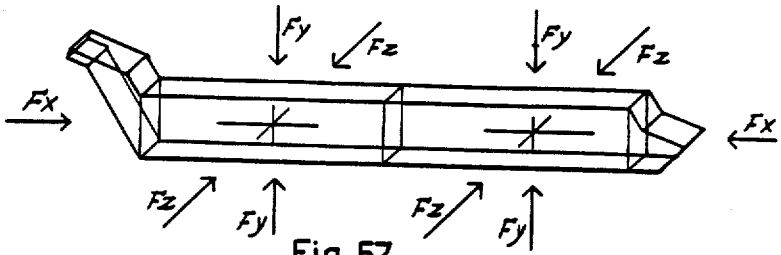

FIGS. 19 to 26 show an embodiment of the system for the handle engagement with a head, in external view with the handle partially matched, in a section according to XX—XX of FIG. 22, in a section according to XXI—XXI of FIG. 22, in a view according to XXII—XXII of FIG. 19, in section according to XXIII—XXIII of FIG. 19, in the views according to XXIV—XXIV and XXV—XXV of FIG. 21 and in an end perspective view;

FIGS. 27 to 33 show two views of a head, the same head being presented at one handle in two orthogonal views, two orthogonal views of the opposite handle end, and an enlarged cross section view of the handle with the head housed therein;

FIGS. 34 to 39 show similarly to FIGS. 27 to 32 a further embodiment;

FIGS. 40 and 41 show similarly to FIGS. 20, 21 a modified embodiment of them;

FIGS. 42, 43 show in a perspective way two further embodiments of the grip end of a handle;

FIGS. 44 to 48 show in a perspective way and in two geometrical views, a head and a handle end, as well as two geometrical views of the other handle end;

FIGS. 49 to 53 show in side view two handles in the arrangements for the coupling, two views according to LI—LI of FIG. 49 and LII—LII of FIG. 50 as well as a view of the head fitted in the handle;

FIGS. 54 to 56 show in several views the operations for the removal or the insertion of the head into the handle of FIGS. 49 to 53;

FIG. 57 shows a general diagram; and

Figure 58:
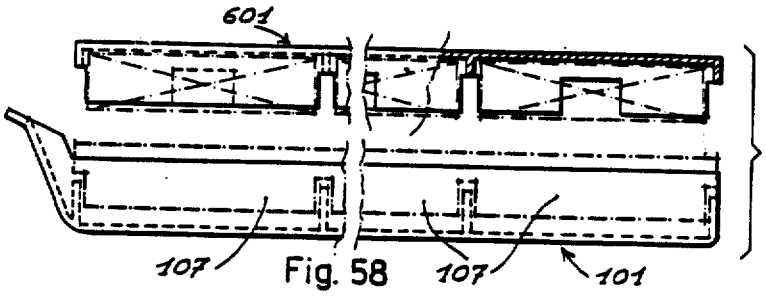
Figure 59:
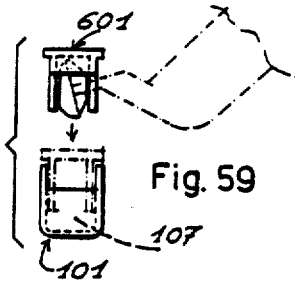

FIGS. 58 and 59 show a further construction with one handle only.

Referring first to FIGS. 1 to 18, 1A and 1B indicate two razor handles equal between them. Each of these is channel-like developed with a cross section substantially U-shaped and with the sides jointed with diaphragms 3, 4 outside and 5 inside, to define in this way two seats 7 in each handle. In each set a shaving head 9 of traditional or particular type may be received. In a central position of the longitudinal dimension of each seat 7, a notch 12 is provided in the handle wall, which notch results equally spaced between the wall 5 and the wall 4 or respectively 3. Each notch 12 has, from the edge of the respective seat, such a depth as to permit one end of a handle to be inserted therethrough for a release engagement of the head 9 received in the same seat, in order to be able to remove it by a sliding parallel to the wings of the U-shaped cross section of the handle.

Each of th handles 1A and 1B has, at one end, adjacent to diaphram 4, an appendix 14 for the engagement of the head; said appendix has a suitable shape to engage the head in the grip central point provided therein. Various shapes of appendices 14 which are illustrated in the drawing will be described hereinafter.

In the example of FIGS. 1 to 17, like in FIG. 42, an appendix 14 is provided made up of two wings 141 and of a front small wall 142 having two edges parallel between them and transversal to the handle to be engaged in the suitable head seat. At the end opposite to that provided with the appendix 14 three laminar appendices are provided, two outside indicated by 16 and one inside indicated by 17, to cooperate—in the manner described below—to the mutual engagement of the two handles 1A and 1B.

The two handles 1A, 1B may be matched to each other as shown in particular in FIGS. 1 to 4, in such a mutual engagement that the two seats 7 of one of the handle face the seats 7 of the other handle, the seats 7 thus resulting mutually covered and closed. The relative engagement between the two handles 1A and 1B is carried out through the shapings of plate 142 of the appendix 14 of one handle and of the inside laminar appendix of the other handle, both having step-profile for release cooperating. The engagement and disengagement easily take place through a relative sliding and the release overcoming of a limited resistance to the elastic deformation; the engagement and disengagement—according to the construction—may be carried out by relative longitudinal sliding between the two handles being put in contact along the seat openings edges, respectively by relative approach and moving away in a direction perpendicular or inclined to the longitudinal handle orientation.

Upon matching, the two handles 1A, 1B, equal between them, have notches 12 which match to each other thus defining (see FIG. 4) two small windows through which it is possible to control also the presence of the shaving heads.

Figure 1:
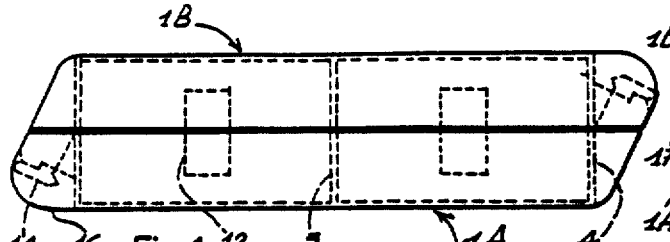
FIGS. 1, 2, 3 and 4 show geometrical views of a pair of razor handles matched with each other.
Figure 2:
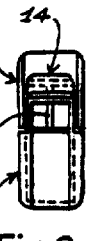
Figure 3:
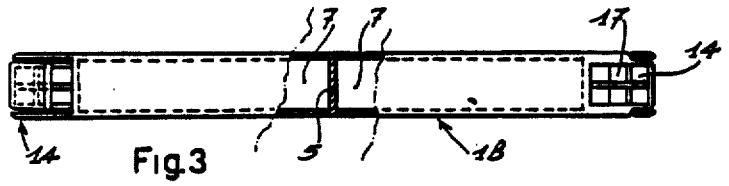
Figure 4:
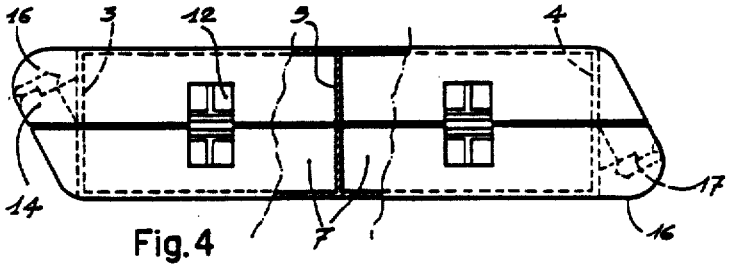
Figure 5:
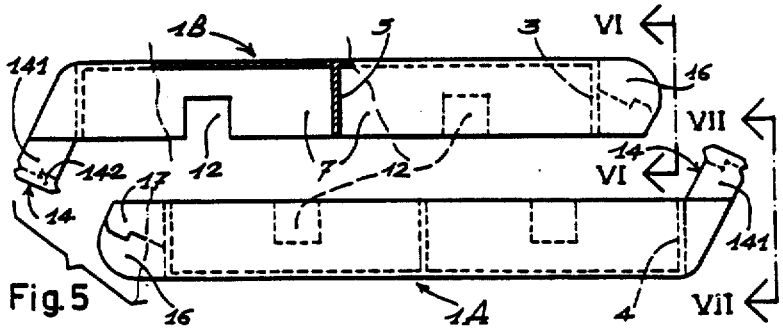
FIGS. 5, 6 and 7 show, similarly to FIG. 1, the two handles, but being separated between them, and in addition two end views according to VI—VI and VII—VII of FIG. 5.
Figure 6:
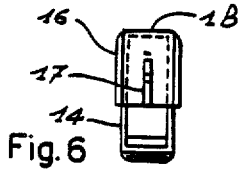
Figure 7:
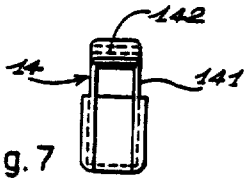
Figure 8:
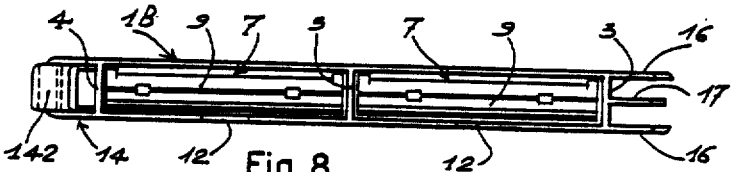
FIGS. 8 and 9 show views of the two handles from the face of them destined to the matching.
Figure 9:
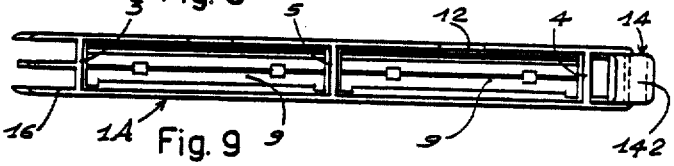
Figure 10:
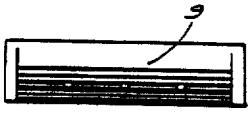
FIGS. 10, 11 and 12 show separately a possible type of head able to be received in a handle as illustrated in the preceding Figures.
Figure 13:
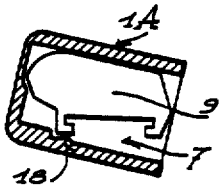
FIG. 13 shows in enlarged cross section the handle with a head seat and a head engaged therein.
Figure 12:
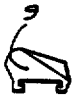
Figure 11:
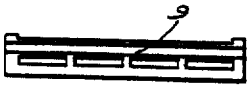
Figure 14:
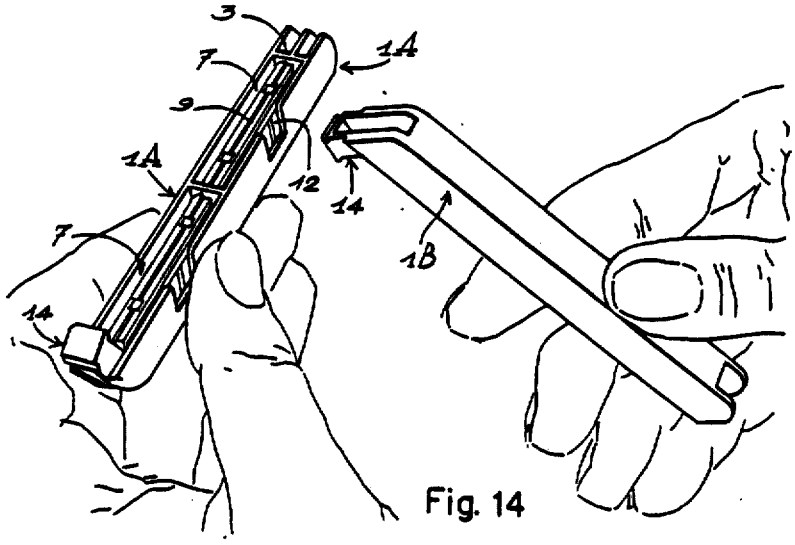
FIGS. 14, 15, 16 and 17 show steps for the drawing out of a head till to the conditions for the razor use.
Figure 15:
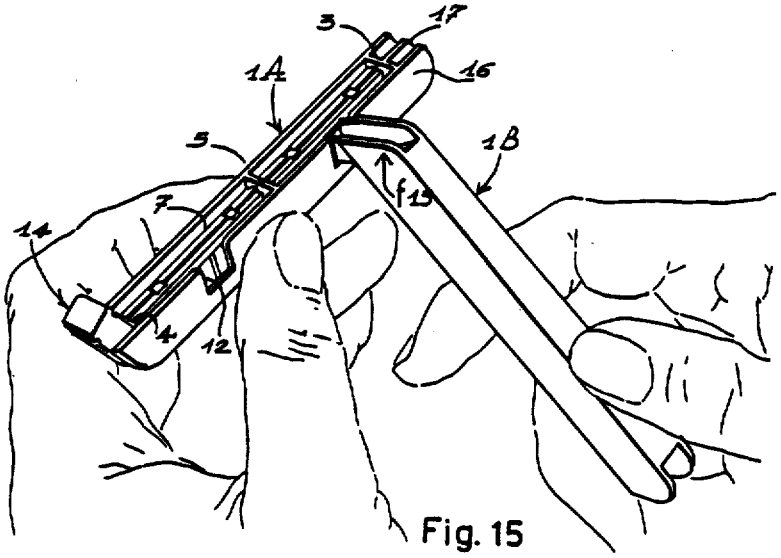
Figure 16:
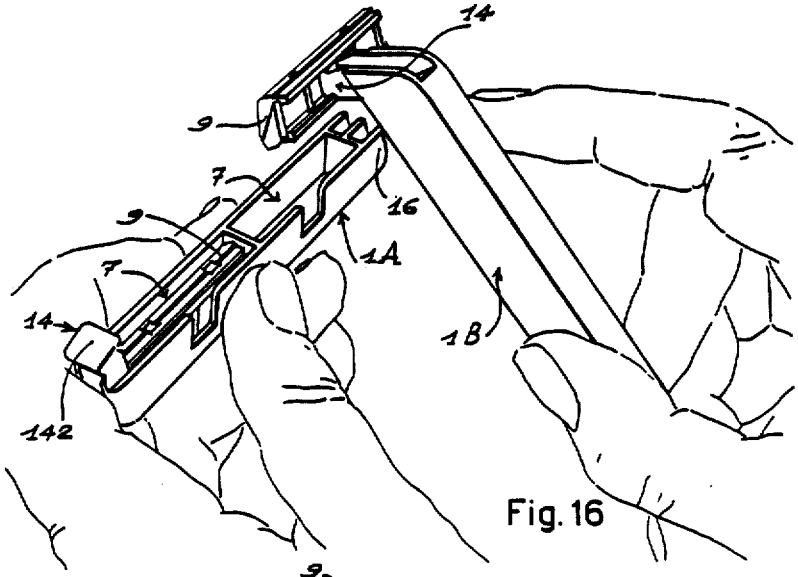
Figure 17:
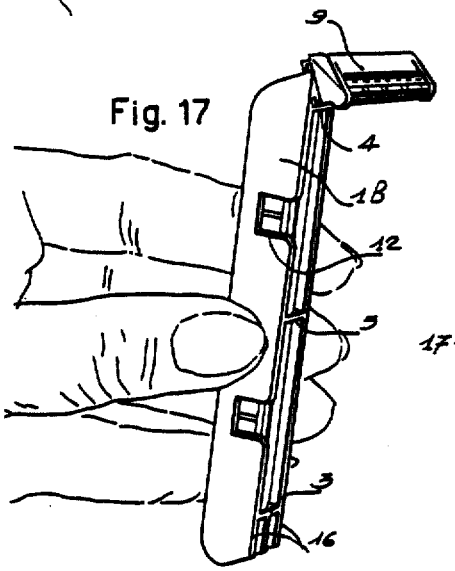
Figure 18:
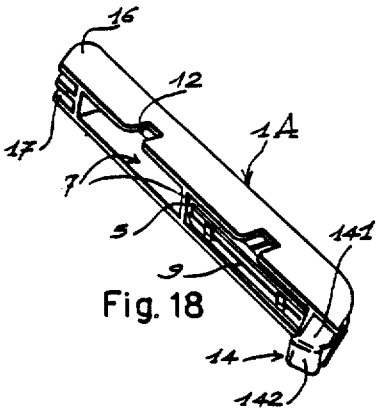
FIG. 18 shows a perspective view of a handle which can be used.

A shaving head 9 may be suitably retained with a limited effect of restraint in the respective seat 7 either by a simple friction resistance or, possibly, by a proper shape of at least one of the inside walls of the seat, which cooperates with a corresponding shaping of the head—as can be seen in FIG. 13 by way of example—to obtain an interference which can be overcome by a limited effort.

By examining FIGS. 1 to 5 and FIGS. 14 to 17 it will be apparent that in the matching situation the two handles make up a compact and substantially closed package comprising two handles and four heads (FIGS. 1 to 4). By disconnecting the two handles 1A and 1B from each other, it is possible to utilize one of the handles (1B in FIGS. 14 to 17) for the razor use. By this handle 1B, one of the heads housed in the seat 7 of the other handle 1A, can be drawn out: by inserting the appendix 14 into the corresponding notch 12 (FIGS. 14, 15); by engaging the same appendix 14 into the housing provided in the head 9 (this housing being located in correspondence of notch 12); and then by forcing—according to arrows f15 of FIG. 15—the handle 1B towards the handle 1A to uproot the head 9 engaged by the handle 1B and thus drawing out said head 9 (FIG. 16) engaged by the handle 1B. Thus, the razor made up of pieces 1B and 9 is ready for use, the handle 1A resulting temporarily unused. The razor use is possible by a handle which retains in its seats heads which are not in use and new or even utilized to be thrown away together with the handle after the exhaustion of handles and heads store represented by the two handles and four heads shown in FIGS. 1 to 4. It is not excluded, however, that the assembly of FIGS. 1 to 4 might be supplied with further spare heads. In any case, the pair of handles 1A, 1B makes up an easy and compact package for a certain use autonomy. On the other hand, the two handles are relatively not very expensive, considering that they make up at one time both the handle for the razor heads and the whole package ready to be displayed to the public with a possible foldable and transparent envelope. The unit offers an appreciable compactness and overall dimensions extremely reduced in comparison with the ones of traditional packages. The package may be also of pocket-size type; it may be apt for automatic distribution in hospitals, hotels and other communities. The package compactness makes easy all the handling operations for packaging, box enclosing, storage, forwarding, display and distribution. It should be appreciated that a single mold forming the two equal handles permits both the production of the handles and the packaging, eliminating, therefore, the need of producing different pieces as in the traditional solutions (handle, guard cap for the head, blister for packaging). It should be noted that the amount of synthetic material required for the molding is relatively much reduced respect to the one necessary for the traditional constructions; the high stiffness due to the shape is ensured in spite of the low quantity of material. On the other hand, the handle lightening required to meet economy in the synthetic resin consumption is exploited to utilize the lightening cavities as a housing for a safe preservation of the heads, while the head presence in one handle during use, tends to reduce the typical drawbacks of the extralight razors (such as vibrations, resonances and other) by offering a handle made heavy by the presence of the heads which increase its firmness in use. These and other objects and advantages will be apparent to those skilled in the art.

A modified form of the grip and engagement appendix of the head (respect to the construction illustrated in FIGS. 1 to 18 and 42) is shown in FIG. 43 where, adjacent to the transversal diaphragm 4, the appendix 14 is developed by two fork-shaped wings 143 forming two opposite edges 144 which may resiliently approach to each other by a flexion of the material the two wings 143 are made of; this allows the elastic deformations to be transferred to the handle, which deformations are demanded from the head material in the preceding solution.

A further embodiment of the grip and restraint appendix of the head is shown in FIGS. 19 to 26, in which the appendix 14 is elastically deformable in its shape. In this construction, two wings 145 are jointed by a plate 16 which makes up one of the two grip edges. The other grip edge 147 is made up of a lever member 148, which is located in intermediate position between the two wings 145 and is jointed to the transversal diaphragm 4 by a fulcrum-heel 148A of such dimensions as to consent an easy deformation when acting on the end 148B of the lever member 148 according to arrow f148. In this construction a shaping of the inside surfaces of wings 161 of the end 16 and of the outside surfaces of wings 145 with projections and impressions designated by 162 and 145A, may be provided to ensure the mutual restraint between the two handles (FIGS. 19 and 20); in this case, instead of an intermediate wall 17, a cover-like profling 171 is provided able to cover the elastic edges 146 and 147 in the mutual coupling between the two handles, which are elastically retained between them by the limited restraint effect operated between the cooperating shapings 162 and 145A.

In FIGS. 40 and 41 a modified construction, respect to the one previously illustrated, of the grip and restraint appendix 14 is shown. The modification is substantially represented—respect to the construction of FIGS. 19 to 26—by the fact that the wings 145, together with plate 146, form a support for the lever 148 which carries the edge 147 and is engaged—instead by a fulcrum 149A—by an elastic fulcrum 148C rising from plate 146 rather than from diaphragm 4.

The construction of FIGS. 27 to 33 provides for the use of a particular head 91 of a different type being already on the market; in this case, each one of handles 1A, 1B has a grip appendix 214, shaped as shown in the drawing for the engagement in the channel formed by the head 91, with mutual yielding of sides and edges. A correspondent shaping of ends 216 is to cooperate with the appendix 214 for the mutual restraint between handles 1A and 1B through dispositions analogous to those illustrated for example in FIGS. 19 to 26 or in FIGS. 44 to 48.

FIGS. 34 to 39 show a construction for the use of heads 92 derived from traditional razors. In this case, each handle 1A and 1B has a grip and engagement appendix 314 with two side by side symmetrical wings 314A which are elastically yieldable to penetrate in a release or forced way in corresponding seats of the head in order to retain it. In this construction, the opposite end of each handle is shaped as shown at 316 (FIGS. 38 and 39) with two wings apt to flank the appendix 314 by engaging therewith through reliefs and depressions-type shapings in a similar manner as has been provided with reference to FIGS. 19 and 20.

In FIGS. 44 and 48 there is shown a further modified construction of the handles 1A and 1B to cooperate with heads 94 of a different type. In this case the grip and restraint appendix of the head is developed with a pair of projections 414, able to penetrate with some shrinkage in corresponding seats of the head. The opposite end of each handle is shaped as shown at 416 (FIGS. 47 and 48) in order to cooperate with projections 414 so that to complete the package formed by two equal and opposite connected handles.

In the construction of FIGS. 49 to 54 a modification is shown of the handles indicated by 101A and 101B which are, however, shaped with appendices 514 and 516 analogous to those 414 and 416. In this construction, the handles present two seats 70 which no longer open sideways with the handle U-shape cross section, but they open at the ends; accordingly, in this construction, the heads are not inserted into and drawn out with a movement transversal to the handles extension, but with a sliding in the longitudinal direction. In this case, instead of notches 12, longitudinal slots 112 are provided, which rise from the end edges of the handles where the seats 70 open being developed as a longitudinal well with a single transversal intermediate diaphragm 505. The drawing out of a head 95 is obtained by inserting the shaped end 514 into the slot 112 and by longitudinally sliding the razor package thus formed along the slot 112 itself for the removal.

In the summarizing diagram of FIG. 57, it is intended that one handle may receive heads in seats which open according to different directions as indicated by the various arrows, that is, according to both longitudinal (FX) and transversal (FY and FZ) directions, according to opposite orientations and according to two pairs of orientations at right angle to each other. The dispositions may be alternative or even accumulative; in the latter case a handle construction can be obtained having a plurality of seats and representing therefore a package for the same number of heads. In this case, a protective and enclosing envelope will have possibly to be provided.

In FIGS. 58 and 59 a handle 101 is provided, which has two or even three seats 107 to receive the same number of heads, and which is closed by a cap 601; this cap engages—with suitable shapings—the heads which fit into the seats 107. The cap, developed as a razor handle, cooperates substantially with a housing forming head seats which housing, in turn, may not be shaped as a razor handle.

It should be understood that the drawing shows an exemplification given only as a practical demonstration of the invention, as this invention may vary in the forms and dispositions without nevertheless coming out from the idea on which the same invention is based.

I claim:

1. A compact shaving unit comprising a pair of overturned oppositely disposed handles in mutual and detachable engagement with respect to each other, each of said handles having a top portion defining a razor head seat for receiving a razor head and a bottom portion defining a head seat receiving means, and wherein each of said razor handles is configured as a U-shaped channel, each of said U-shaped channels having a bottom wall, two side walls, and an open top;

said U-shaped [channel] *channels* being dimensioned such that when the two handles are oppositely disposed in mutual and detachable engagement to form the compact shaving unit during non-use, the open top of the U-shaped channel of each handle faces the other;

each of said U-shaped channels having a plurality of transverse separating walls[,] which define [a plurality of] *at least one* head-receiving storage [chambers, each of which] *chamber for* detachably [retains] *retaining* a razor head for storage, the mutual and detachable engagement being such that the head seat of each handle engages the corresponding head seat-receiving means of the other handle, whereby said releasably engaged handles are maintained as a single compact unit.

2. The compact shaving unit of claim 1, wherein each head-receiving storage chamber contains a notch in one side wall, centrally located between said transverse separating walls;

said notch being dimensioned such that the razor head seat of the other handle can be inserted into said notch to engage [said] *a* razor head in order to withdraw the razor head from the head-receiving storage chamber.

3. The compact shaving unit of claim 1, wherein the top portion and the bottom portion of each handle is open, and one side wall of each head-receiving storage chamber contains a longitudinal notch which runs from the open end of the handle for a distance at least partially along each head-receiving storage chamber;

said longitudinal notch being so dimensioned that the head seat of the other handle may be inserted into said longitudinal slot to engage [the] *a* razor head *detachably retained in said head-receiving storage chamber;* which razor head may then be removed from the head-receiving storage chamber by sliding the head seat of the other handle which is engaged to the razor head along said longitudinal slot, thereby sliding said razor head out of the head-receiving storage chamber through the open end of the handle.

4. The compact shaving unit of claim 1, wherein said handles are releasably engaged to each other by slidably engaging one handle with the other handle.

5. The compact having unit of claim 1, wherein said handles are releasably engaged to each other by detachably engaging the razor head seat of each handle with the head seat receiving means of the other handle.

*6. The compact shaving unit of claim 1, further comprising a razor head detachably retained in said head-receiving storage chamber of at least one of said handles.*

*7. The compact shaving unit of claim 1, wherein the plural transverse separating walls of each of said U-shaped channels define a plurality of head-receiving storage chambers in each said handle.*

* * * * *